Patented Apr. 17, 1951

2,549,455

UNITED STATES PATENT OFFICE 2,549,455

PRODUCTION OF ESTERS FROM OLEFINIC COMPOUNDS, CARBON MONOXIDE, HYDROGEN AND ORGANIC CARBOXYLIC ACIDS

William F. Gresham and Richard E. Brooks, Wilmington, Del., assignors to E. I. du Pont de Nemours & Company, Wilmington, Del., a corporation of Delaware No Drawing. Application January 28, 1948, Serial No. 4,935

13 Claims. (Cl. 260—488)

This invention relates to a novel process for the synthesis of esters and more particularly to a process for the synthesis of esters by simultaneous reaction between carbon monoxide, hydrogen, an olefinic compound and a member of the class consisting of saturated organic carboxylic acids.

It was known heretofore that olefinic compounds, such as olefinic hydrocarbons, can be made to react with carbon monoxide and hydrogen at elevated temperatures and pressures to give aldehydes or alcohols having one carbon atom per molecule more than the number of carbon atoms present in a molecule of the olefinic reactant (Roelen, U. S. 2,327,066; Gresham et al., S. N. 598,208, filed June 7, 1945, now Patent No. 2,437,600 and S. N. 636,263, filed December 20, 1945). While it has been possible to direct the olefin-CO-hydrogen reaction to the formation of aldehydes almost exclusively, thus suppressing the formation of ketones, alcohols and other oxygen-containing organic compounds, as disclosed in the Gresham et al. application S. N. 598,208, it has nevertheless not been possible to direct the reaction exclusively to the formation of alcohols.

An object of this invention is to provide a novel process for the synthesis of esters from relatively inexpensive starting materials. Another object of the invention is to direct the reaction between olefinic compounds, carbon monoxide, hydrogen and organic carboxylic acids to the formation of esters exclusively, thus suppressing the formation of aldehydes, ketones and other oxygen-containing organic compounds. Other objects of the invention will appear hereinafter.

The invention is based in part upon the discovery that olefinic compounds react with carbon monoxide and hydrogen in the presence of an organic carboxylic acid to give esters; the yield of esters obtained from the said reactants is considerably higher than would be obtained if the reaction products obtained from the olefinic compound, carbon monoxide and hydrogen were esterified by reaction with the organic carboxylic acid in a separate step, following the initial reaction. In other words, the organic carboxylic acid has an unexpected directing effect upon the reaction, suppressing the production of oxo compounds, and resulting in the formation of esters as the chief reaction products under conditions which would normally be expected to yield oxo compounds in substantial quantity.

In accordance with the present invention, a novel process for the synthesis of esters is provided. This novel process comprises reacting carbon monoxide and hydrogen simultaneously with an olefin (e. g. an olefin hydrocarbon) and a saturated organic carboxylic acid at a temperature in the range of 140° to 375° C. under superatmospheric pressure (suitable pressures being in the range of 325 to 5000 atmospheres) in the presence of a catalytic quantity of a cobalt-containing or ruthenium-containing catalyst dissolved in the reaction mixture, the mol ratio of carbon monoxide : $H_2$ being initially in the range of 1:3 to 3:1, and thereafter separating from the resulting mixture the ester produced by the interaction of the carbon monoxide, hydrogen, olefin hydrocarbon, and a member of the class consisting of saturated organic carboxylic acids and saturated organic carboxylic acid anhydrides.

Any olefin hydrocarbon may be employed in the practice of the invention. Suitable olefinic hydrocarbons include ethylene, alkyl-substituted ethylenes (such as propylene, butene-2, isobutylene, pentene-1, tetramethyl ethylene, diisobutylene, triisobutylene, tetraisobutylene, higher polyisobutylenes containing olefinic unsaturation, cracked gasoline fractions, propylene tetramer, propylene hexamer), cyclohexene, butadiene, isoprene, polymerized dienes, butadiene-xylene polyalkenylation products, mixed olefins or olefin fractions obtainable from cracking and/or dehydrogenation of petroleum, cyclohexadiene, dicyclopentadiene, natural rubber, styrene, alpha-methyl styrene, vinyl cyclohexenes, pinene, limonene, and the like. Outstanding results are obtained in the practice of the invention by using aliphatic olefin hydrocarbons which are not consumed by polymerization or other reactions under the conditions required for the formation of the desired esters; the said olefin hydrocarbons may contain from 2 to 20, or more, carbon atoms per molecule.

Any saturated organic carboxylic acid may be employed in the practice of the invention. By "saturated" organic carboxylic acid is meant a carboxylic acid which is saturated in the radicals attached to the carboxyl group, e. g. acetic acid, in accordance with this definition, is not an unsaturated carboxylic acid but is a saturated one despite the fact that it contains a C=O group. Suitable organic carboxylic acids which may be employed effectively include formic acid, acetic acid, propionic acid, butyric acid, isobutyric acid, caproic acid, caprylic acid, glutaric acid, adipic acid, etc. In preferred embodiments, alkanoic acids are generally employed especially the lower alkanoic acids having from 1 to 10 carbon atoms per molecule.

The formation of esters in accordance with this invention occurs at a temperature within the range of about 140° to 375° C. preferably about 175° to 275° C. At temperatures which are too low for optimum conversion to ester, oxo compounds are produced to some extent. It is advantageous to employ relatively high pressures in the practice of the invention, e. g. pressures within the range of about 325 to 5000 atmospheres. At pressures of about 300 atmospheres and below relatively little ester is produced and the reaction gives rise to the formation of aldehydes, ketones and small amounts of alcohols as the chief reaction products.

In general, it is desirable to employ pressures considerably above 325 atmospheres, e. g. pressures in excess of about 500 atmospheres. The maximum pressure which may be employed in the practice of the invention is limited only by the strength of the available materials of construction. Pressures in excess of 1500 atmospheres are generally not advantageous, however.

Any cobalt-containing or ruthenium-containing substance may be employed as a catalyst in the practice of the invention. It is generally preferred to employ a catalyst which is dissolved in the reaction mixture (i. e., dissolved in one or more ingredients thereof). Suitable catalysts which are soluble in the reaction mixture include cobalt and ruthenium salts of organic carboxylic acids or inorganic acids, cobalt and ruthenium carbonyls, cobalt and ruthenium carbonyl complexes, cobalt substituted amides, etc. Nickel catalysts, in general, give poor results. The preferred catalysts are cobalt or ruthenium salts of alkanoic acids or cobalt salts of other organic acids, e. g. cobalt naphthenate, cobalt benzoate, and the like. The quantity of catalyst required in the practice of the invention may be varied rather widely. Olefins which are highly reactive, such as diisobutylene, generally require only extremely minute quantities of catalyst. A convenient quantity of catalyst is in general about 0.01% to 20% by weight based on the total weight of the reaction mixture.

The initial mol ratio of carbon monoxide : $H_2$, for best results, should be within the range of about 1:2 to 2:1. When a very large excess of hydrogen is employed the conversion of the olefin to ester is relatively poor, and loss of the olefinic reactant by hydrogenation becomes excessive. On the other hand, if the mol ratio of carbon monoxide : $H_2$ is high, e. g. about 4:1 or higher, no substantial quantity of ester is obtained, and the reaction gives rise to the formation of other oxygen-containing organic compounds, including at least small quantities of aldehydes.

The formation of esters, in one embodiment of the invention, may be represented as follows:

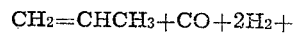

However, this type of reaction does not explain the formation of all of the esters which are obtained in the practice of the invention. For example, in the reaction between ethylene, carbon monoxide, hydrogen and acetic acid not only is propyl acetate obtained but a higher ester, namely 2-methylpentyl acetate, is also produced as one of the chief products of the reaction. It is entirely possible that these higher esters are formed by a reaction mechanism which involves aldolization of any aldehyde initially produced from the olefin, carbon monoxide and hydrogen followed by reaction between the resulting aldol, hydrogen, and carboxylic acid to form the higher ester. Whatever the mechanism of the reaction, the fact remains that among the chief products of the reaction between the olefin, carbon monoxide, hydrogen and carboxylic acid, esters of alcohols having $2n+2$ carbon atoms per molecule, $n$ being the number of carbon atoms in a molecule of the olefinic reactant, are frequently obtained, especially when the olefinic reactant contains no more than 8 carbon atoms per molecule.

The invention is illustrated further by means of the following examples.

*Example 1.*—A mixture consisting of 120 grams of acetic acid, 1 gram of cobalt acetate, and 112 grams of tetraisobutylene was heated in a stainless-steel reaction vessel having a capacity of 325 cc. with carbon monoxide and hydrogen (initial mol ratio of CO : $H_2$=1:1) with agitation under a pressure of 700 atmospheres at a temperature of 213° to 225° C. for one hour. Distillation of the resulting product gave a branched chain heptadecyl acetate (B. P. 123° to 130° C./1 to 2 mm.). The conversion of tetraisobutylene to heptadecyl acetate was 60%, based upon the amount of tetraisobutylene charged into the reaction vessel.

Repetition of the experiment under similar conditions but in the absence of the carboxylic acid reactant gave a 35% conversion to a mixture of C17 aldehyde and alcohol containing predominating quantities of the alcohol.

*Example 2.*—A mixture consisting of 60 grams of acetic acid, 28 grams of ethylene and 2 grams of cobalt acetate was heated in a stainless-steel shaker tube with carbon monoxide and hydrogen (mol ratio 1:1) under a pressure of 700 atmospheres for 54 minutes at a temperature of 175° to 200° C. Distillation of the resulting product gave 10 grams of propyl acetate, 20 grams of a fraction, B. P. 96° to 110° C., containing both propyl acetate and acetic acid, and 8 grams of 2-methylpentyl acetate, which had a boiling point of 157° to 159° C. at atmospheric pressure (refractive index at 25° C.=1.4060; saponification number, 366—theory for 2-methylphentyl acetate, 389).

*Example 3.*—In a series of experiments a mixture of acetic acid and diisobutylene (mol ratio 4:1) containing 0.05% by weight of cobalt acetate catalyst was heated with carbon monoxide and hydrogen under a pressure of about 700 atmospheres for 30 minutes at a temperature of 175° to 200° C. Following this, the reaction was "finished off" by heating for 30 minutes at a temperature of 250° C. The CO : $H_2$ ratio in this series of experiments was varied as set forth in the following table which shows the effect of variations in CO : $H_2$ ratio upon the conversion of the olefin to branched chain nonyl acetate (3,5,5-trimethylhexyl acetate).

*Conversion of diisobutylene to nonyl acetate by reaction with carbon monoxide, hydrogen and acetic acid (cobalt acetate catalyst, 175 to 250° C., 700 atmospheres)*

| $CO:H_2$ Ratio | Conversion to Nonyl Acetate (B. P. 55° to 60° C./1 to 2 mm.) |
|---|---|
| 1:2 | 61%. Some hydrogenation of the diisobutylene occurred. |
| 1:1 | 70% to 71%. |
| 2:1 | 70% to 71%. |
| 4:1 | Aldehydic product; ester was not formed as one of the chief products. |

*Example 4.*—A mixture consisting of 21 grams of propylene, 102 grams of acetic anhydride, and 2 grams of cobalt acetate catalyst was heated at a temperature of 175° to 226° C. for 31 minutes with carbon monoxide and hydrogen (approximately equal molar quantities) under a pressure of 500 to 1000 atmospheres. The resulting product was removed from the reaction vessel and steam distilled. Redistillation of the distillate gave a mixture of butyl acetates (conversion 36% based upon the quantity of propylene initially present).

*Example 5.*—A mixture of 54 grams (0.5 M) of vinylcyclohexene (butadiene dimer), 120 grams (2 M) of acetic acid and 2 grams of dehydrated cobalt acetate was charged into a stainless steel reaction vessel and subjected to a pressure of 375 to 710 atmospheres at 223° to 260° C. with a 1:1 molar mixture of carbon monoxide and hydrogen for 70 minutes. After cooling to room temperature the product was withdrawn from the reaction vessel and distilled. After removal of excess acetic acid and unconverted vinylcyclohexene there was obtained two products: (1) 38.7 grams of ethylcyclohexylmethyl acetate, B. P. 68° to 75° at 1 mm. (42.5% conversion) and (2) 24.1 grams of acetoxymethyl-cyclohexylpropyl acetate, B. P. 139° to 145° at 1 mm. pressure (18.8% conversion).

*Example 6.*—A mixture of 27 grams (0.25 M) of vinylcyclohexene, 120 grams (2 M) of acetic acid and 0.5 gram of dehydrated cobalt acetate processed at 225° to 240° C. and 450 to 700 atmospheres pressure with a 1:1 molar mixture of carbon monoxide and hydrogen for 30 minutes resulted in 44.4% conversion to ethylcyclohexylmethyl acetate and 31.2% conversion to acetoxymethylcyclohexylpropyl acetate.

*Example 7.*—A charge similar to the above (Example 6), but using 5 grams of a supported cobalt-thoria catalyst instead of cobalt acetate and processed at 170° to 220° C. and 500 to 700 atmospheres pressure with a 1:1 carbon monoxide-hydrogen mixture for 30 minutes resulted in 22.4% conversion to the above mentioned monoester and 47.8% conversion to the diester.

*Example 8.*—A mixture of 27.5 grams of 3-ethylcyclohexene, 120 grams (2 M) of acetic acid and 1 gram of cobalt acetate processed at 182° to 208° C. and 440–720 atmospheres for 1 hour with a 1:1 mixture of carbon monoxide and hydrogen resulted in 69.6% conversion to the same monoester (B. P. 76–79°/2 to 3 mm. or 230° to 233° at 1 atmosphere, $N_D^{25}$, 1.4462) as was obtained from vinylcyclohexene, carbon monoxide, hydrogen, and acetic acid.

*Example 9.*—A mixture of 25 grams of butadiene-xylene polyalkenylation product (obtained from butadiene, xylol and sodium) of iodine number 341 and viscosity 550 centipoises, 125 grams of glacial acetic acid and 1.5 grams of anhydrous cobalt acetate was agitated in a stainless steel shaker tube with an equimolar mixture of carbon monoxide and hydrogen at 460 to 700 atmosphere pressure and 230° to 255° C. for fifty minutes. The cooled products were blown with air for thirty minutes. Unreacted acetic acid was then distilled out at 40 mm. pressure. The residual oil was diluted with benzene, agitated for thirty minutes at 65° to 75° C. with 20 grams of sodium acid sulfate monohydrate, then cooled and filtered. After distillation of the benzene under reduced pressure there remained 35.2 grams of oil having an ester number of 222, an acid number of 5 and an iodine number of 40.

*Example 10*—A mixture of 111.6 grams (0.4 mol) oleic acid, 240 grams (4.0 mol) glacial acetic acid and 0.2 gram anhydrous cobaltous acetate was agitated in stainless-steel shaker tubes with a 1:1 mixture of carbon monoxide and hydrogen gases at 177° to 185° C. and 410 to 500 atmosphere pressure for thirty minutes, then at 245° to 255° C. and 630 to 690 atmosphere pressure for an additional thirty minutes. The discharged products were refluxed fifteen minutes at atmospheric pressure to decompose cobalt carbonyls. Unreacted acetic acid was then distilled out at 40 mm. pressure. The residual products were freed of cobalt by washing with aqueous hydrochloric acid, then with water.

Partial distillation at 3 mm. pressure yielded 25.7 grams of distillate, B. P. 160° to 200° C. at 3 mm. pressure and 102.2 grams of undistilled higher-boiling product. Analysis of the two fractions for acid and ester content indicated the distillate to be composed of 14.1 to 19.2 grams of stearic acid and 6.5 to 11.6 grams of acetoxymethylstearic acids and the undistilled product to be acetoxymethylstearic acids of at least 95% purity. From these data the yields and conversions based on oleic acid were 18% to 24% to stearic acid and 76% to 80% to acetoxymethylstearic acids. Hydrogenation of this acetoxymethylstearic acid in methanol solution in the presence of copper-zinc catalyst at 550 to 700 atmospheres, 270° to 277° C., gave nonadecyl glycol, a crystalline solid having a boiling point of 185° to 195° at 3 mm. pressure.

*Example 11*—In a series of experiments numerous olefins were heated with carbon monoxide and hydrogen (approximately equal molal quantities) and acetic acid under a pressure of 700 atmospheres for one hour at a temperature of 175° to 250° C. The esters obtained in these experiments are set forth in the following table.

*Conversion of various olefins by reaction with carbon monoxide, hydrogen and acetic acid (cobalt acetate catalyst, 175° to 250° C., 700 atmospheres, 1 hour reaction time)*

| Olefin Used | Ester Obtained |
|---|---|
| Ethylene | 30% to propyl acetate; 25% to 2-methylpentyl acetate. |
| Propylene | 61% to butyl acetate (iso+normal); 28% to octyl acetate. |
| Diisobutylene | 71% to nonyl acetate (branched chain), B. P. 55° to 60° C./1 mm., $N_D^{25}$=1.4210. |
| Tetrapropylene | 68% to tridecyl acetate (branched chain), B. P. 95° to 110° C./2 mm., $N_D^{25}$=1.436. |
| Triisobutylene | 60% to tridecyl acetate (branched chain), B. P. 95° to 105° C./2 to 3 mm., $N_D^{25}$=1.4345. |
| Tetraisobutylene | 60% to heptadecyl acetate (branched chain), B. P. 123° to 130° C./1 mm., $N_D^{25}$=1.4469. |
| Cyclopentadiene | Mixture of esters, B. P. 50° to 165° C./2 to 3 mm. |
| Propylene hexamer | 48.8% to nonadecyl acetate (branched chain), B. P. 145° to 155° C./2 mm., $N_D^{25}$=1.4520. |

*Example 12.*—A mixture of 56 grams of diisobutylene, 120 grams of acetic acid, and 2 grams of a catalyst composed of ruthenium oxide (5% by weight) supported on alumina was heated with carbon monoxide and hydrogen (mol ratio 1:1) at 250° to 268° C. During one hour of operation 17.3 grams of nonyl acetate was produced.

It is to be understood that the above examples are illustrative only and that numerous methods of practicing the invention will appear to one who is skilled in the art. For example, the process of the invention can be operated either batchwise or continuously. Any suitable method for recycling the unreacted carbon monoxide and hydrogen, or the other ingredients of the reaction mixture which are convertible to esters, may be employed. The catalyst can be produced in situ if desired, e. g. by reaction of a source of cobalt with the organic carboxylic acid.

Any suitable reaction vessel may be employed in the practice of the invention. It is generally preferred to employ a pressure-resistant vessel made of or lined with inert materials such as silver, stainless steel, copper, refractories, or the like. A reaction vessel which has been in contact with a compound of cobalt, in certain instances, becomes sufficiently contaminated with cobalt to permit carrying out the reaction therein without additional quantities of catalyst. Careful investigation has shown however that at least minute quantities of cobalt are generally present whenever the reaction takes place at a reasonably rapid rate.

The esters obtained in the practice of the invention in many instances cannot be obtained by other methods known to the art. This is true, for example, of the esters of the formula

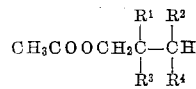

in which $R^1$, $R^2$, $R^3$, and $R^4$ are so chosen that

is an olefinic compound of the class consisting of tetrapropylene, hexapropylene, triisobutylene, tetraisobutylene, butadiene dimer, and butadiene-xylene polyalkenylation products. All of these esters are very useful in practical operations, as plasticizers, lubricants, etc. Moreover they can be converted to the corresponding alcohols quite readily by saponification, and the said alcohols in turn can be converted to sodium sulfate esters, or other such sulfates, which are of very great value as surface active compositions, lubricating oil additives, hydrocarbon fuel additives and the like. Unlike the primary alkanol sodium sulfate esters previously known in the art these sodium sulfate esters are, in general, soluble in hydrocarbon solvents.

In certain instances, the olefin reactant may undergo conversion or transformation to other olefinic materials under the conditions for the formation of esters in accordance with this invention. For example, at temperatures in excess of about 275°, tetraisobutylene tends to depolymerize and to yield esters of alcohols lower in molecular weight than heptadecyl alcohol. When it is desired to avoid such reactions, it is generally preferable to operate at relatively low temperatures, e. g. at temperatures of about 150° to 275° C.

Since many different embodiments of the invention may be made without departing from the spirit and scope thereof, it is to be understood that we do not limit ourselves except as set forth in the following claims.

We claim:

1. The method for preparing esters while suppressing the formation of oxo compounds from an olefinic reactant, carbon monoxide and hydrogen, which comprises interacting an olefinic compound simultaneously with carbon monoxide, hydrogen and an organic carboxylic acid, and continuing the said interaction in the presence of a catalytic quantity of an organic carboxylic acid salt of an element of the class consisting of cobalt and ruthenium, at a temperature of 140° to 375° under a pressure in excess of 300 atmospheres until the ester formed by the said interaction is produced as the chief reaction product, and thereafter separating the said ester from the resulting mixture.

2. A process for the synthesis of esters which comprises reacting carbon monoxide and hydrogen simultaneously with an olefin hydrocarbon and a saturated organic carboxylic acid at a temperature in the range of 140° to 375° C. under a pressure of 325 to 5000 atmospheres in the presence of a catalytic quantity of a cobalt salt of an organic carboxylic acid dissolved in the reaction mixture, the mol ratio of carbon monoxide : $H_2$ being initially in the range of 1:3 to 3:1, and thereafter separating from the resulting mixture the ester produced by the interaction of the carbon monoxide, hydrogen, olefin hydrocarbon, and the saturated organic carboxylic acid.

3. A process for the synthesis of esters which comprises reacting carbon monoxide and hydrogen simultaneously with an aliphatic olefin hydrocarbon having from 2 to 20 carbon atoms per molecule and an aliphatic carboxylic acid at a temperature in the range of 140° to 375° C. under a pressure in the range of 325 to 1500 atmospheres, in the presence of a catalytic quantity of a cobalt salt of an organic carboxylic acid dissolved in a reaction mixture, the mol ratio of carbon monoxide : $H_2$ being initially in the range of 1:3 to 3:1, and thereafter distilling from the resulting mixture the ester produced by the interaction of the carbon monoxide, hydrogen, aliphatic olefin hydrocarbon, aliphatic carboxylic acid.

4. The process of claim 3 in which the said aliphatic carboxylic acid is acetic acid.

5. The process of claim 3 in which the said aliphatic carboxylic acid is formic acid.

6. The process of claim 3 in which the said aliphatic carboxylic acid is propionic acid.

7. The process of claim 3 in which the said olefin hydrocarbon is propylene.

8. The process of claim 3 in which the said olefin hydrocarbon is tetraisobutylene.

9. The process of claim 3 in which the said olefin hydrocarbon is diisobutylene.

10. The process of claim 3 in which the said catalyst is a cobalt salt of an alkanoic acid.

11. The process of claim 3 in which the said catalyst is cobalt naphthenate.

12. A process for the synthesis of esters which comprises reacting carbon monoxide and hydrogen simultaneously with an olefin hydrocarbon and a saturated organic carboxylic acid at a temperature in the range of 140° to 375° C. under a pressure of 325 to 5000 atmospheres in the presence of a catalytic quantity of a ruthenium salt of an organic carboxylic acid dissolved in the reaction mixture, the mol ratio of carbon monoxide : $H_2$ being initially in the range of 1:3 to 3:1, and thereafter separating from the resulting mixture the ester produced by the interaction of the carbon monoxide, hydrogen, olefin hydrocarbon, and the saturated organic carboxylic acid.

13. The acetate esters of the formula

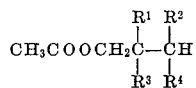

in which $R^1$, $R^2$, $R^3$, and $R^4$ are so chosen that the radical

is the residue of an olefinic compound of the class consisting of tetrapropylene, triisobutylene, tetraisobutylene, butadienexylene polyalkenylation products, propylene hexamer, vinyl cyclohexene, and oleic acid.

WILLIAM F. GRESHAM.
RICHARD E. BROOKS.

No references cited.